C. T. BARNES.
Smoke and Gas Consumer for Stoves.
No. 231,142. Patented Aug. 17, 1880.

2 Sheets—Sheet 1.

Witnesses
G. R. Hoffman
N. Cowles

Inventor
Charles T. Barnes
By Gridley & Co
Attys.

C. T. BARNES.
Smoke and Gas Consumer for Stoves.
No. 231,142. Patented Aug. 17, 1880.
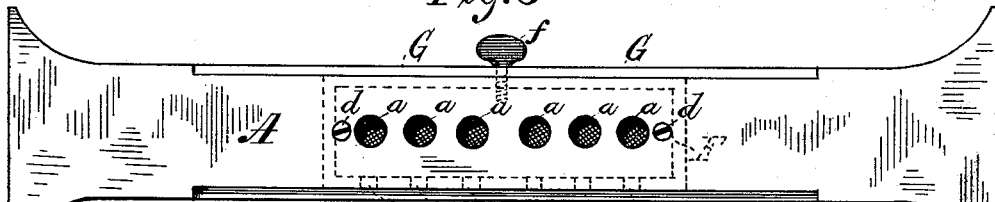
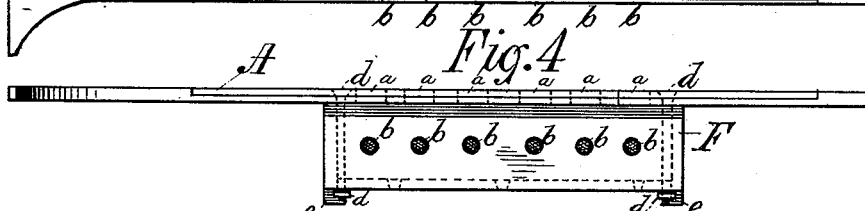
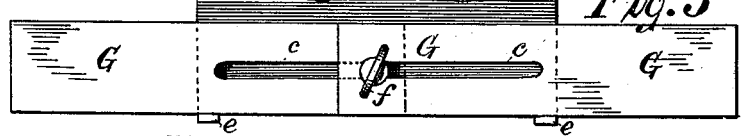
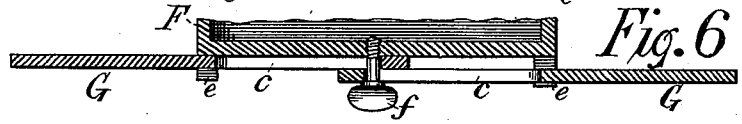
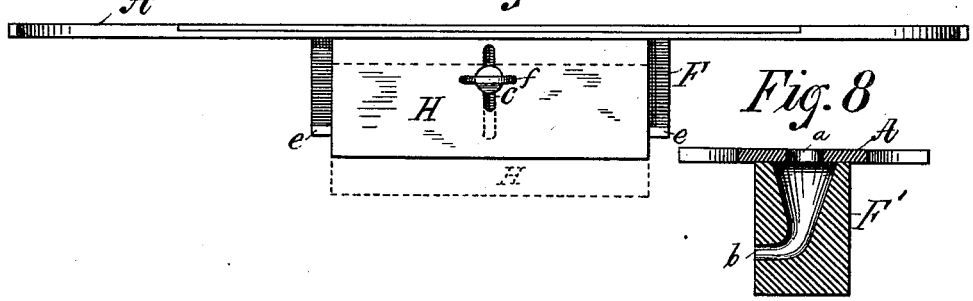
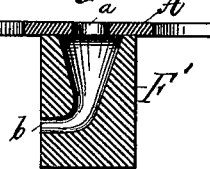
Witnesses
G. R. Hoffman
N. Cowles
Inventor
Charles T. Barnes
By Gridley & Co.
Attys

UNITED STATES PATENT OFFICE.

CHARLES T. BARNES, OF CHICAGO, ILLINOIS.

SMOKE AND GAS CONSUMER FOR STOVES.

SPECIFICATION forming part of Letters Patent No. 231,142, dated August 17, 1880.

Application filed April 15, 1879.

*To all whom it may concern:*

Be it known that I, CHARLES T. BARNES, of Chicago, in the county of Cook and State of Illinois, have invented a new and useful Improvement in Gas and Smoke Consumers for Cook-Stoves and Ranges; and I do hereby declare the following to be a full, clear, and exact description thereof, which will enable others skilled in the art to which my invention appertains to make and use the same, reference being had to annexed drawings, forming part hereof, and in which—

Figure 1:
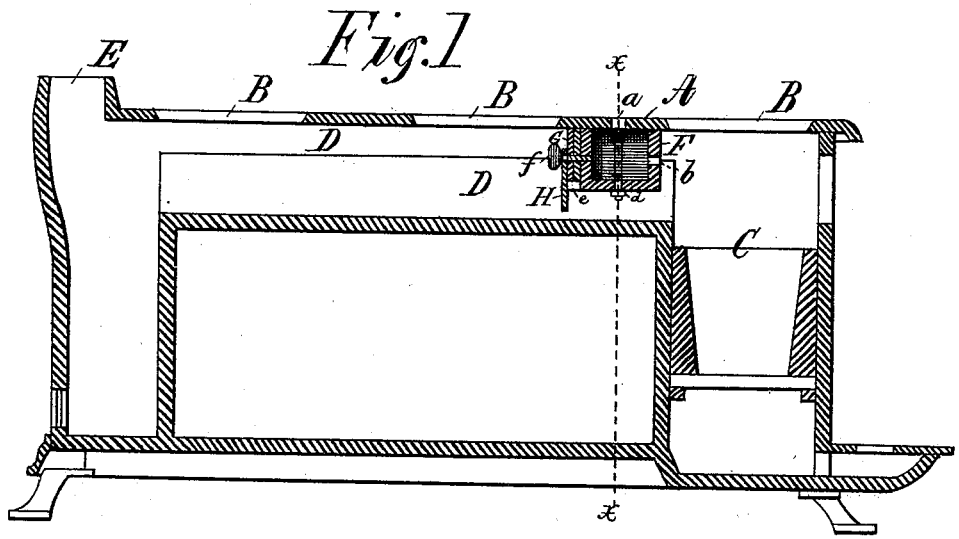
Figure 2:
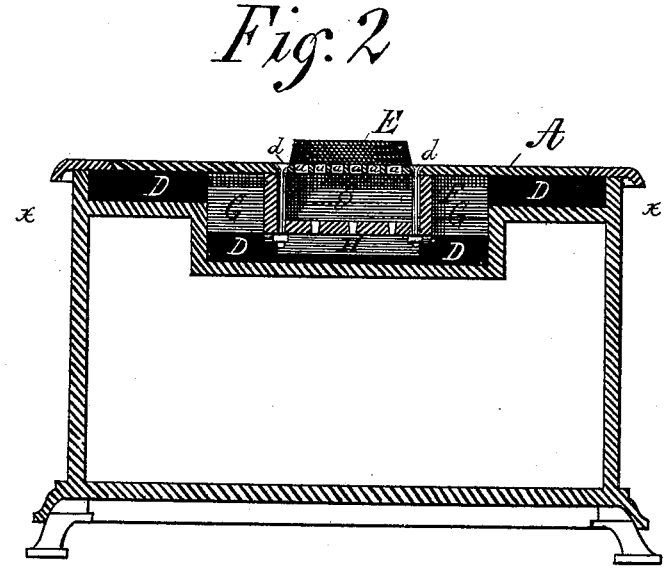

Figure 1 represents a longitudinal section of a cook-stove embodying my invention. Fig. 2 represents a transverse section of the same. Fig. 3 represents an enlarged top view of a center plate to which my invention is applied. Fig. 4 represents a front view of the same. Fig. 5 represents a front view of the longitudinal sliding sheets when extended. Fig. 6 represents a longitudinal central section of the above sliding sheets in an extended position. Fig. 7 represents the vertical slide, the dotted lines showing the same when extended. Fig. 8 represents a vertical section of a modified form of my invention.

Like letters of reference indicate like parts.

My invention relates to that class of gas and smoke consumers attached to cook-stoves and ranges for the purpose of burning all combustible matter not consumed in the firebox by admitting an addititional supply of air; and the object of my invention is to produce a cheap and effective device, which may be readily applied to any make or style of stoves or ranges now known and used.

It is well known that the top or upper plate of cook-stoves and ranges, as usually constructed, are composed of covers or griddles and center plates, all of which may be readily removed and easily duplicated, and that their arrangement is ordinarily such that one of the center plates is located near and immediately above the back wall of the fire-box, as shown in Figs. 1 and 2.

My invention consists in providing the last-named center plate with perforations passing through the surface thereof, and also with a perforated box attached to the lower side thereof, so that air may pass through the box and into the stove. This perforated box is of a length so that it only partly covers the center plate, and can therefore be placed in the center or at either end thereof, and of a depth so as to extend nearly or quite down to the oven-top, thus forming a shut-off for the purpose of cutting off at that point the direct draft toward the escape or exit opening, and also for the purpose of diminishing the opening or diameter of the flue, as hereinafter more fully described and claimed.

In the drawings, A represents the center plate; B, the griddle-openings; C, the fire-box; D, the flue; E, the exit or stove-pipe opening.

The center plate, A, is provided with a series of perforations, $a$.

F is a box, preferably of cast-iron and open at its top only, which, by means of bolts or screws $d$, is firmly secured to the lower side of the center plate, A, and extends down into the flue. That wall of the box F which faces the fire-box C is provided with a series of perforations, $b$, the combined area of which is less than the combined area of the perforations $a$ through the center plate, A. The bottom of the box F is also provided with perforations, as shown, for the purpose of allowing ashes which may accumulate therein to escape therefrom.

G G are longitudinally-adjustable sliding sheets loosely connected with the rear wall of the perforated box F, and are provided with slots $c$, and by means of a set-screw, $f$, passing through the slots $c$, these sliding sheets may be extended and firmly held in position. These sliding sheets are for the purpose of further diminishing the diameter or opening of the flue D at its front end, so that the size of its opening may be made to correspond with the size of the exit or stove-pipe opening E. This is indispensable to insure a good draft, and without the latter a complete combustion of gas and smoke cannot be effected.

The box F as usually applied to stoves is about six inches long, two inches wide, by three inches deep, and in many cases is in itself sufficient to reduce the opening of the flue to the proper size without using the sliding sheets G.

$e$ are lugs on the rear of the box F at the lower and outer ends thereof, as shown, and are for the purpose of sustaining the longitudinal sliding sheets G G from sagging down at their ends.

I am well aware that gas and smoke consumers in connection with stoves are old; but a trial of those known to me has taught me that they are inoperative.

I find, in practice, that in order to produce a complete combustion of gas and smoke the air must be conducted into the stove without first passing through lengthy channels or pipes, as in such cases it loses its igniting force, and that the pure or free air must be allowed to come in immediate contact with the gas and smoke or products of combustion from coal as soon as generated or released therefrom.

It will be readily observed that since the perforations $a$ through the center plate, A, admit more air than can possibly be fed into the stove through the perforations $b$ in the front side of the box F, the latter is always full of free air, which is conducted to the gas and smoke to be consumed by passing through the thickness only of the front wall of the box F.

In lieu of the several perforations $a$ through the center plate, A, a longitudinal slot in area equal to the former may be substituted. This substitution applies equally well to the perforations $b$ in the box F.

A solid dependent lug or block of iron may be used in lieu of the box F when provided with a series of conical-shaped orifices, so curved that their smallest diameter penetrates the side of the lug or block F' facing the fire-box C, as shown in Fig. 8.

Having thus described my invention, what I claim as new, and desire to secure by Letters Patent, is—

1. A center plate for cook-stoves and ranges, provided with a series of perforations, $a$, through the top thereof leading into a dependent box, F, the box F provided with a series of perforations, $b$, through its wall facing the fire-box, and so arranged that the air may pass into the top of the box F through perforations $a$, and into the stove through perforations $b$, substantially as and for the purpose specified.

2. A center plate for cook-stoves and ranges, provided with a series of perforations, $a$, through the top thereof leading into a dependent box, F, the box F provided with a series of perforations, $b$, through its wall facing the fire-box, and so arranged that the air may pass into the top of the box F through perforations $a$, and into the stove through perforations $b$, in combination with one or more sheets, G, substantially as and for the purpose specified.

CHARLES T. BARNES.

Witnesses:
G. R. HOFFMAN,
N. COWLES.